US012546161B2

(12) United States Patent
Beswick et al.

(10) Patent No.: US 12,546,161 B2
(45) Date of Patent: Feb. 10, 2026

(54) POCKET DOOR FRAME ASSEMBLY

(71) Applicant: Beyond The Grain, LLC, Southwest Ranches, FL (US)

(72) Inventors: Dale Beswick, Pompano Beach, FL (US); Kevin Cost, Pompano Beach, FL (US)

(73) Assignee: Beyond the Grain, LLC, Southwest Ranches, FL (US)

( * ) Notice: Subject to any disclaimer, the term of this patent is extended or adjusted under 35 U.S.C. 154(b) by 367 days.

(21) Appl. No.: 18/470,056

(22) Filed: Sep. 19, 2023

(65) Prior Publication Data

US 2024/0151097 A1 May 9, 2024

Related U.S. Application Data

(60) Provisional application No. 63/382,911, filed on Nov. 9, 2022.

(51) Int. Cl.
*E06B 3/46* (2006.01)
*E06B 1/52* (2006.01)

(52) U.S. Cl.
CPC .............. *E06B 3/4654* (2013.01); *E06B 1/52* (2013.01)

(58) Field of Classification Search
CPC ......... E06B 1/52; E06B 1/6076; E06B 3/4654
See application file for complete search history.

(56) References Cited

U.S. PATENT DOCUMENTS

| | | | | |
|---|---|---|---|---|
| 1,221,766 A * | 4/1917 | Pitcher | E06B 3/4654 | 49/411 |
| 1,267,415 A * | 5/1918 | Huckestein | E06B 3/4654 | 49/380 |
| 2,378,666 A * | 6/1945 | Triller | E06B 3/4654 | 16/95 W |
| 2,564,968 A * | 8/1951 | Forgette | E06B 3/4654 | 16/90 |
| 2,832,105 A * | 4/1958 | Pearson | E06B 3/4654 | 49/372 |

(Continued)

FOREIGN PATENT DOCUMENTS

| | | | |
|---|---|---|---|
| EP | 0505614 B1 * | 6/1996 | E06B 1/6069 |
| FR | 2545144 A1 * | 11/1984 | E06B 3/4654 |
| FR | 2745601 A1 * | 9/1997 | E06B 3/4654 |

*Primary Examiner* — Adriana Figueroa
(74) *Attorney, Agent, or Firm* — McHale & Slavin, P.A.

(57) ABSTRACT

An improved pocket door frame for a sliding door. The frame employs a header support having an overhead track attached by T-nuts. A pair of vertical spreaders form a pocket recess entrance. A vertical stud member is attached to an end of the header support with a plurality of horizontal slats coupling the vertical spreaders to the vertical stud member. The horizontal slats are attached with even spacing and square alignment with plywood panels extending from a base to the header support and fastened to the horizontal slats and vertical stud member. A header spacer is positioned perpendicular to a lower surface of the header support and extends outwardly from the pocket recess. A header frame member is positioned perpendicular to each header spacer and extends outwardly from the pocket recess. The pocket door frame is constructed and arranged to provide dimensional stability and prevent warping or twisting.

12 Claims, 8 Drawing Sheets

(56) References Cited

U.S. PATENT DOCUMENTS

| | | | | | |
|---|---|---|---|---|---|
| 2,857,629 | A * | 10/1958 | Walter | E06B 3/4654 52/211 |
| 3,049,765 | A * | 8/1962 | Elmore | E06B 3/4654 49/504 |
| 3,079,650 | A * | 3/1963 | Spence | E06B 3/4654 160/162 |
| 3,494,076 | A * | 2/1970 | Todd | E06B 3/4654 49/505 |
| 4,742,645 | A * | 5/1988 | Johnston | E06B 3/4654 49/504 |
| 6,058,655 | A * | 5/2000 | Gravel | B60P 7/14 49/306 |
| 10,648,221 | B2 * | 5/2020 | Liu | E06B 3/4654 |
| 2006/0150545 | A1 * | 7/2006 | Migliorini | E06B 3/4654 52/204.1 |
| 2008/0006594 | A1 * | 1/2008 | Layton | E06B 3/4654 211/162 |
| 2014/0075863 | A1 * | 3/2014 | Laronde | E06B 3/4654 52/217 |

* cited by examiner

POCKET DOOR FRAME ASSEMBLY

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/382,911 entitled "IMPROVED POCKET DOOR FRAME ASSEMBLY", filed Nov. 9, 2022. The contents of which the above referenced application is incorporated herein by reference.

FIELD OF THE INVENTION

The invention is directed to pocket doors used in residential and commercial properties and, in particular, to a pocket door frame assembly that maintains rigidity to prevent pocket door failures.

BACKGROUND OF THE INVENTION

A "pocket door" is commonly used in homes and offices to provide a unique space saving feature. Pocket doors can be hidden in a wall by use of a recessed compartment placed in a wall cavity. In modern home and building construction, partition walls are normally constructed from wood studwork covered with a wall skin, such as drywall, sheetrock, plasterboard or the like. The pocket door design requires a builder to leave space in the studwork for a doorway and also for an internal cavity into which a sliding door may be concealed. For this reason, part of the pocket door frame must include the necessary studwork for support of the wall skin. The door frame supports the outer skin of the wall providing wall strength, and providing a frame for the sliding door to travel within. The result is very good space saving characteristics and a contemporary design, as there is no encroachment of a conventional hinged door into the adjoining room. Modern designers realize this and, as a result, pocket doors have made a resurgence in recent years.

However, conventional pocket door frames are known to sag or outright fail over time due to inadequate construction design. The conventional frame relies upon a substandard support for the wall skin which will eventually allow warpage as the frame ages. The conventional frame employs a minimal amount of structural rigidity by relying upon adjacent wall panels for support. Further, conventional framing can be installed improperly, or damaged during installation, due to the required reliance on adjacent wall boards to provide reinforcement. Additionally, the framing can warp over time due to acclimation such as wood and wall board strength variation due to moisture affecting rigidity. Aluminum U-shaped channels were added in an attempt to correct the problem, but the channels can easily be damaged and relying upon adjacent wall boards for strength result in the same failures. Conventional pocket door frames use nails as fasteners which fail to permanently bond members together.

In light of the above, conventional pocket door frames eventually fail resulting in the pocket door rubbing on the frame and making it difficult to open or close. Once the framing for a pocket door fails the frame needs to be replaced, which is complicated task as part of the wall has to be opened. Due to the failure of conventional pocket door, the reputation of pocket doors has soured.

What is needed in the industry is a pocket door frame having a construction technique to address and eliminate pocket door frame warping frame.

SUMMARY OF THE INVENTION

Disclosed is an improved pocket door frame for a sliding door that resists or eliminates frame warping with minimal weight change from conventional pocket door frames. The pocket door frame has a reinforced header and two partial plywood panels constructed and arranged to provide dimensional stability by preventing twisting of the frame. The frame has a header support with an overhead track attached by T-nuts for ease of installation and replacement. A pair of vertical spreaders carry the header support and form a pocket recess entrance. A vertical stud member is attached to an end of the header support with a plurality of horizontal slats coupled to the vertical spreaders. The horizontal slats are evenly spaced and attached in square alignment with plywood panels extending from a base to the header support and fastened to the horizontal slats and vertical stud member. A first and second header spacer positioned perpendicular to a lower surface of the header support extends outwardly from the pocket recess. A first and second header frame member is positioned perpendicular to the first and second header spacer and extends outwardly from the pocket recess.

An objective of the invention is to provide an improved pocket door frame assembly that prevents warpage by providing reinforcement at critical failure locations.

Another objective of the invention is to provide an improved pocket door frame assembly using primed finger joint pine and plywood leading to long term dimensional stability.

Still another objective of the invention is to employ partial plywood panels that are stapled and glued to the horizontal slats and vertical spreaders for increased stability during shipping and installation.

Yet still another objective of the invention is to provide a header with T-nuts, allowing ease of track installation and replacement.

Another objective of the invention is to use a centering block attached to the header during installation, ensuring no side to side movement of the track.

Still another objective of the invention is to eliminate the need for a metal typically used for stability in a conventional frame.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
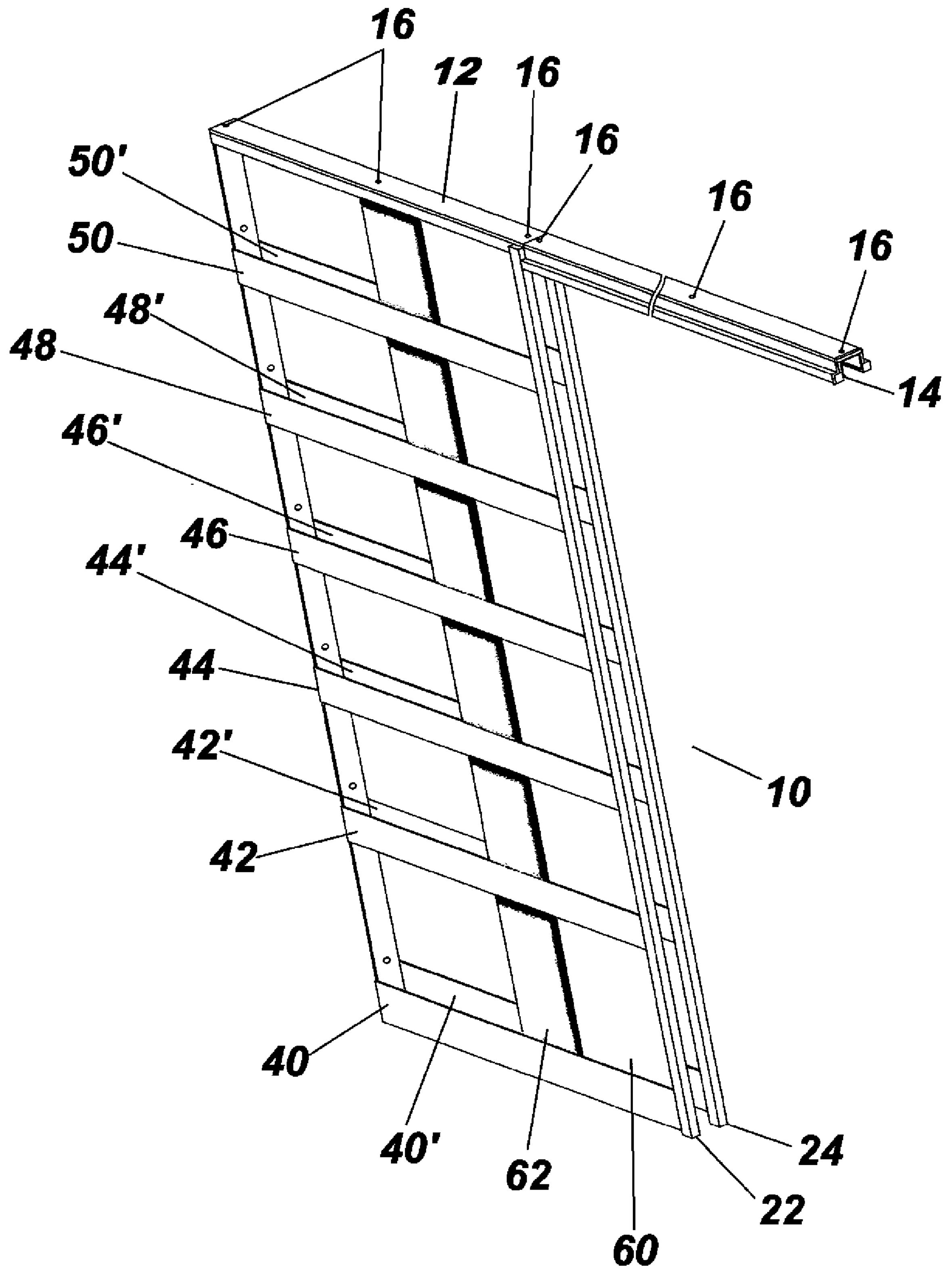
FIG. 1 is an upper perspective view of the frame assembly.
Figure 2:
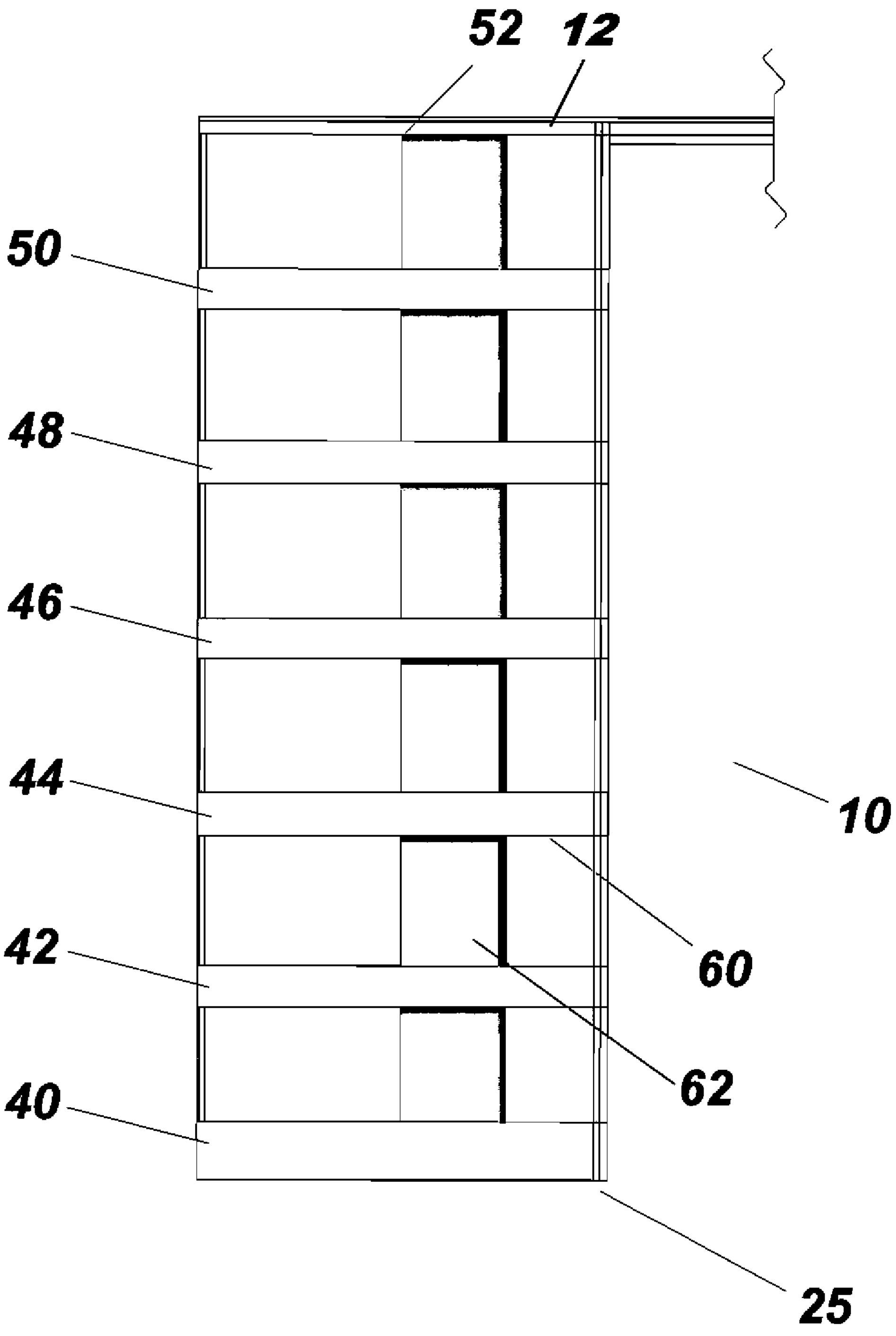
FIG. 2 is a left side view.
Figure 3:
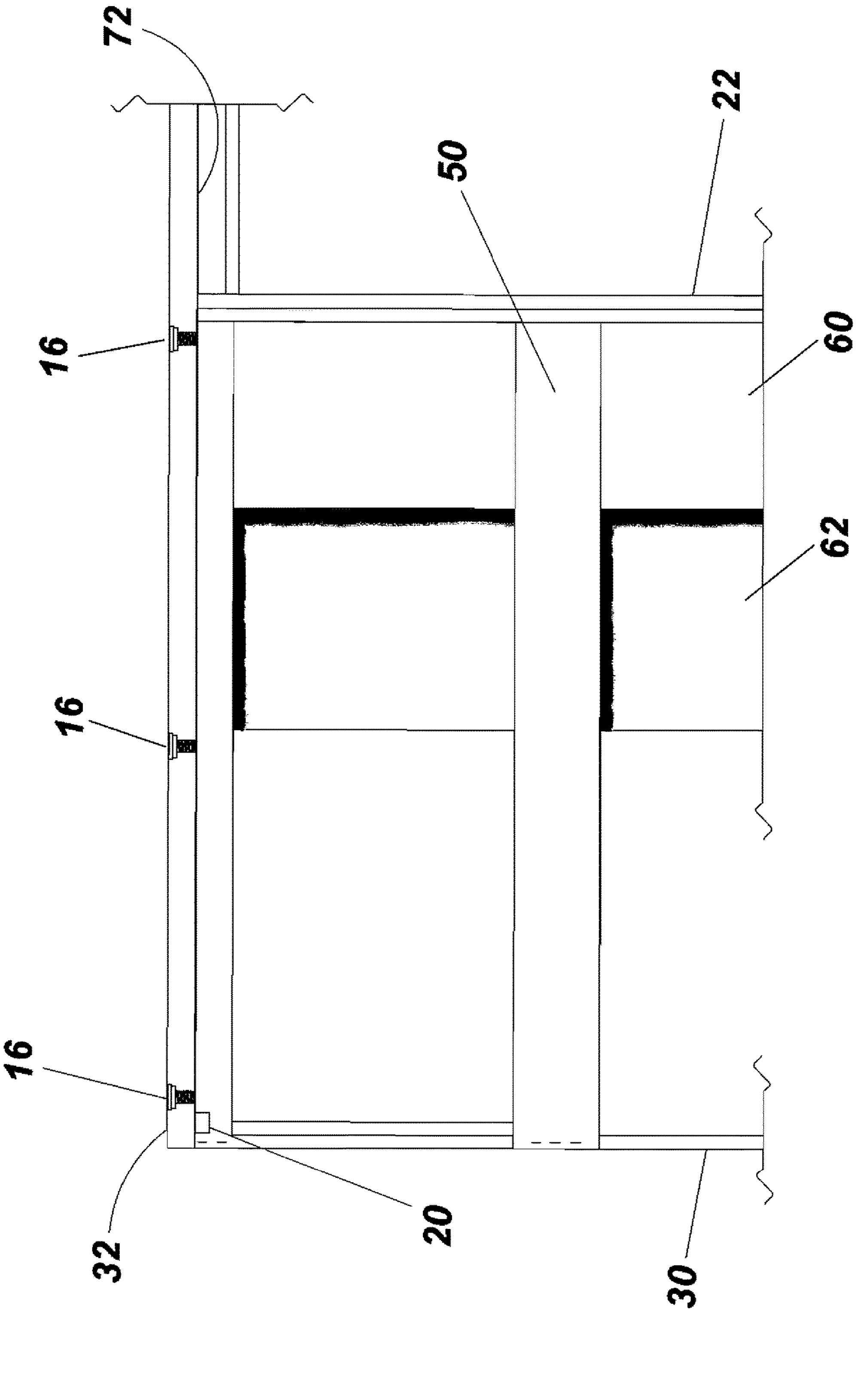
FIG. 3 is a partial left side view.
Figure 4:
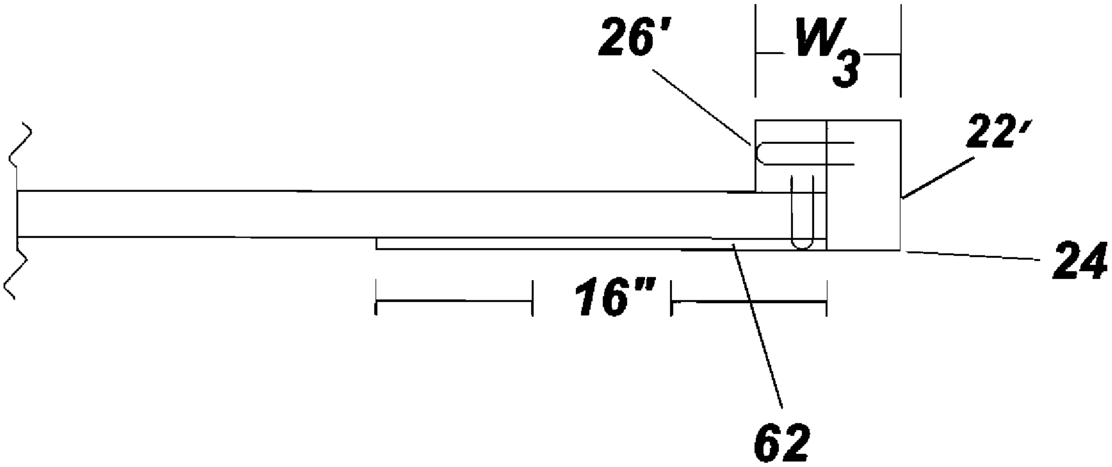
FIG. 4 is a top view depicting the first vertical spreader.
Figure 5:
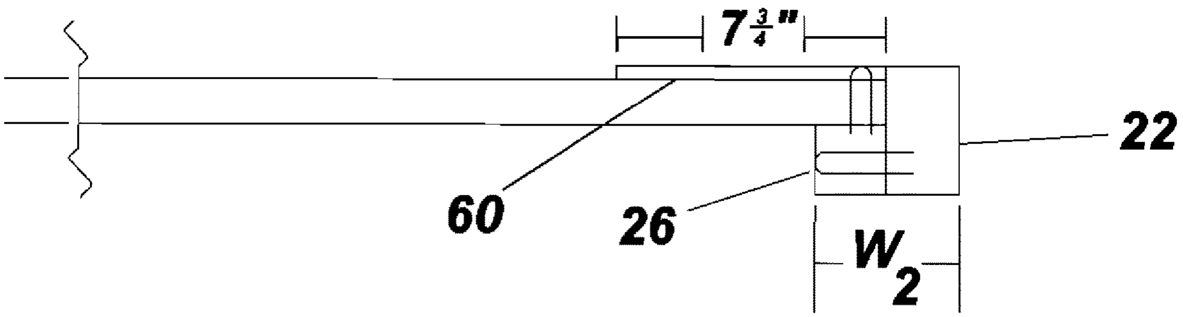
FIG. 5 is a top view depicting the second vertical spreader.
Figure 6:
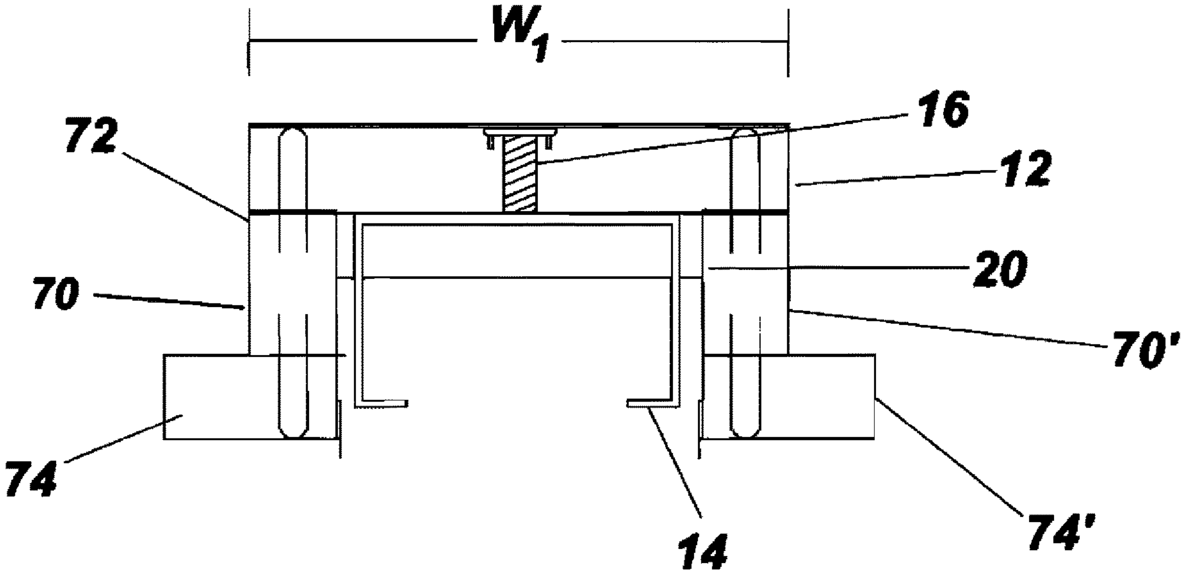
FIG. 6 is an end view of the header support.
Figure 7:
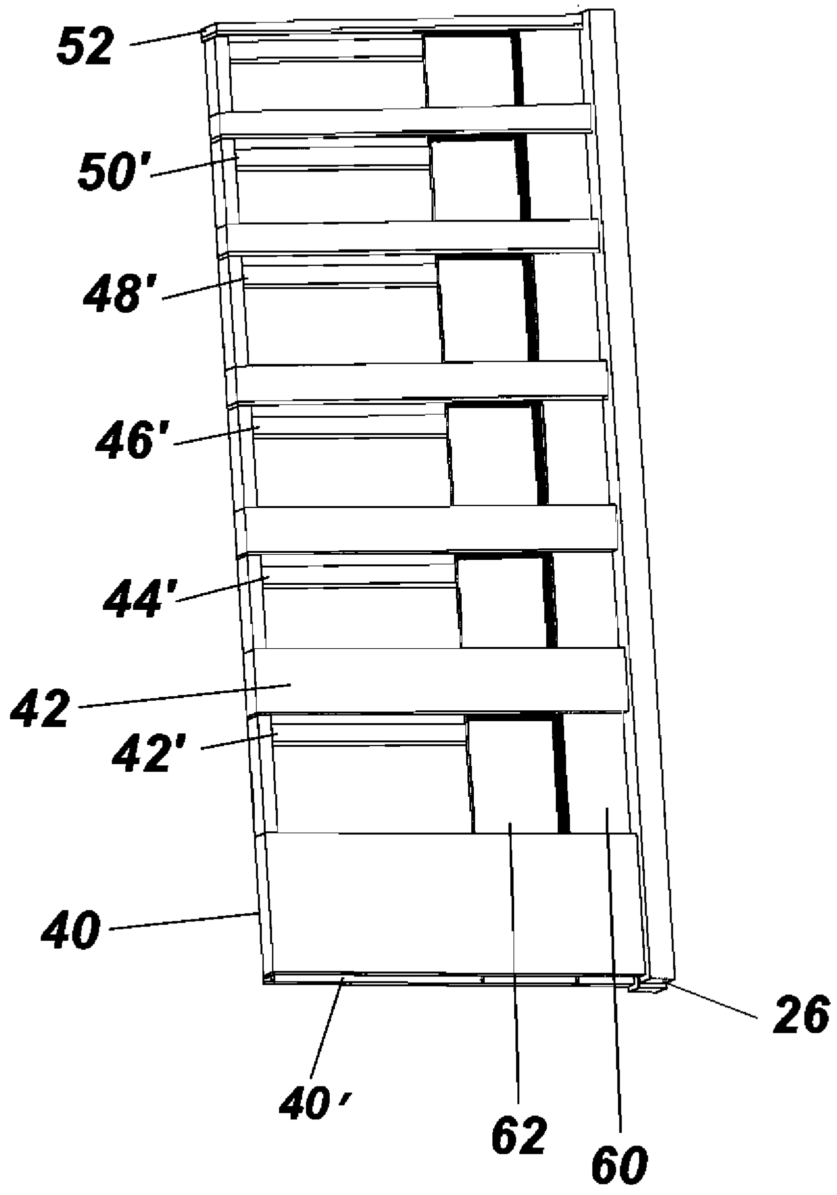
FIG. 7 is a lower perspective view of the frame.
Figure 8:
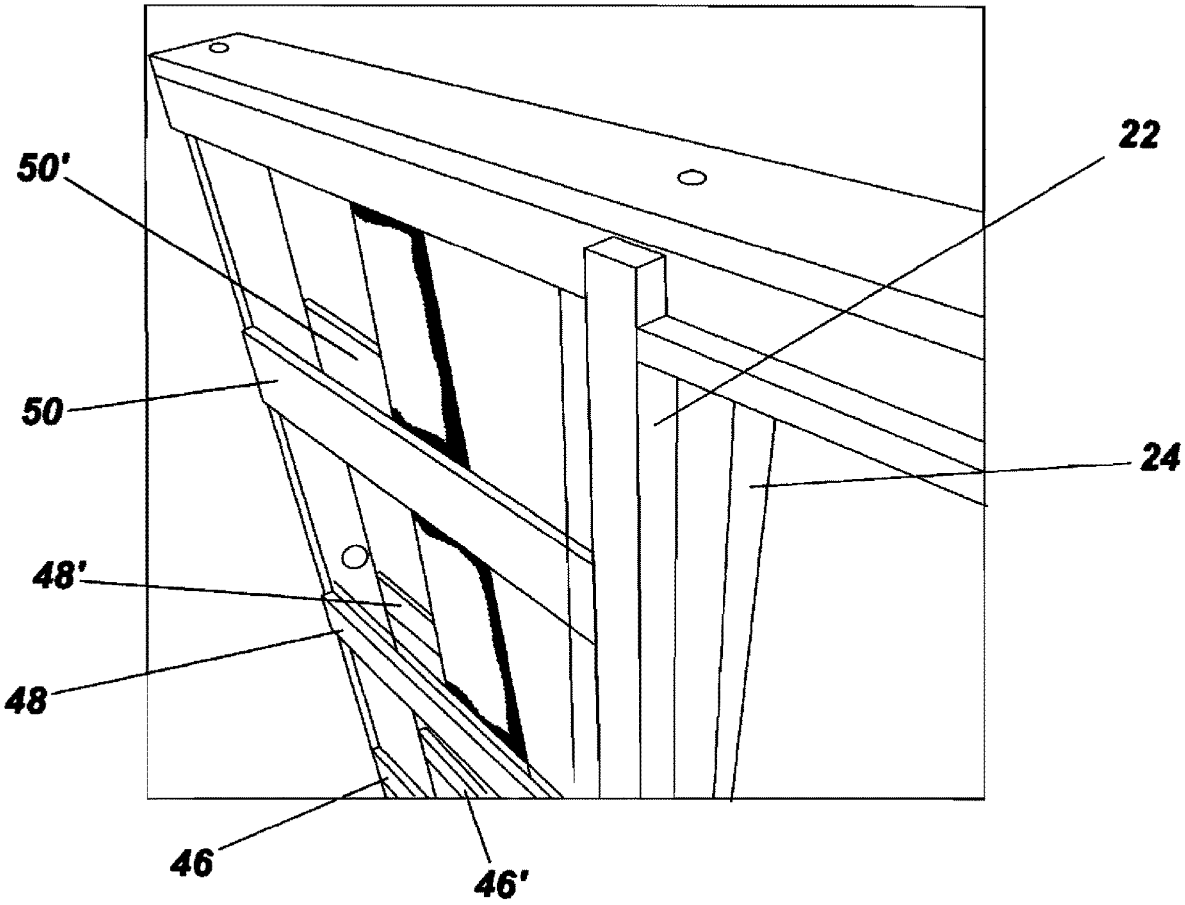
FIG. 8 is a partial upper perspective view.

A detailed embodiment of the instant invention is disclosed herein; however, it is to be understood that the disclosed embodiment is merely exemplary of the invention. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the figures, illustrated is a pocket door frame 10 for a sliding door hung from a header support 12 having a length (L1) and a width (W1). A track 14 is attached to the header support 12 by use of a plurality of T-bolts 16 wherein a fastener 18 is removably attached to each T-bolt 16, allowing ease of track 14 maintenance or replacement. During installation of the pocket door frame, a centering block 20 is attached to a lower surface of the header support 12 to ensure no side to side movement of the track 14 is possible.

A first vertical spreader 22 and a second vertical spreader 24 extend from a base 25 to the header support 12 in a spaced apart position. Each vertical spreader 22, 24 is made from laminated ¾ inch primed finger joint pine and is stapled and glued to the header support 12 forming a spaced apart opening of about 2¼ inches (W1). The first vertical spreader 22 forms an "L" shape by use of a laminated base block 26 forming a width (W2) of about 1½ inches with the base block 26 glued and stapled to the vertical spreader 22. Similarly, the second vertical spreader 24 forms an "L" shape by use of a laminated second base block 26' forming a width (W3) of about 1½ inches with the second base block 26' glued and stapled to the second vertical spreader 24. The first and second vertical spreaders 22, 24 form a pocket recess entryway constructed and arranged to receive a sliding door, not shown.

A vertical stud member 30 is attached to an end 32 of the header support 12, and a plurality of horizontal slats positioned on each side of the vertical spreaders 22, 24 and vertical stud member 30, with all connections using pneumatically driven staples and wood glue at all joined points. The horizontal slats 34 are made of ½ inch primed finger joint pine stapled and glued using an installation jig, not shown, to ensure even spacing and square alignment. The horizontal slats 34 are evenly spaced apart and extend from the base block 26. In a preferred embodiment, first lower slat 40, 40' is 5¼ inches tall; second slat 42, 42' is 3½ inches tall; third slat 44, 44' is 3½ inches tall; fourth slat 46, 46' is 3½ inches tall; fifth slat 48,48' is 3½ inches tall; sixth slat 50, 50' is 3½ inches tall; and top slat 52, 52' is 1½ inches tall and is coupled to the bottom surface of the header support 12, forming a first side. Similarly, a second side is formed by a first lower slat 40' that is 5¼ inches tall; a second slat 42' that is 3½ inches tall; a third slat 44' that is 3½ inches tall; a fourth slat 46' that is 3½ inches tall; a fifth slat 48' that is 3½ inches tall; a sixth slat 50' that is 3½ inches tall; and a top slat 52' that is 1½ inches tall and is coupled to the bottom surface of the header support 12, forming a second side of the pocket recess. The dimensions provided are for a typical 3 foot by 8 foot doorway.

Along the first side is placed a first plywood panel 60 extending from the base 25 to the header support 12, the plywood being ⅛ inch thick and about 7¾ inches wide and fastened to each of the horizontal slats 34 positioned on the first side. The second side has a second plywood panel 62 extending from the base 25 to the header support 12, the plywood being ⅛ inch thick and about 16 inches wide and fastened to each of the horizontal slats 34 positioned on the second side.

Vertical spreaders 22, 24 are positioned about halfway along the length of the header support 12. A first header spacer 70 is positioned perpendicular to a lower surface 72 of the header support 12 and extends outwardly from the pocket recess. A first header frame member 74 is positioned perpendicular to the first header spacer 70 and extends outwardly from the pocket recess. The first header spacer 70 is stapled and glued to the header support 12. The first header frame member 74 is stapled and glued to the first header spacer 70. A second header spacer 70' is positioned perpendicular to a lower surface 72 of the header support 12 and extends outwardly from the pocket recess. A second header frame member 74' is positioned perpendicular to the second header spacer 70' and extends outwardly from the pocket recess. The second header spacer 70' is stapled and glued to the header support 12. The second header frame member 74' is stapled and glued to the second header spacer 70'.

The pocket door frame 10 is constructed and arranged to provide dimensional stability and prevent warping or twisting of the frame when subject to years of environmental pressures such as fluctuating heat and humidity levels.

The term "about" means, in general, the stated value plus or minus 5%. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims.

What is claimed is:

1. A pocket door frame for a sliding door comprising a header support having a first end and a second end forming a first length therebetween;

first and second header spacers secured to said header support and extending along said first length of said header support;

first and second header frame members secured to said first and second header spacers;

a track fastened to a lower surface of said header support and nested between said first and second header spacers and said first and second header frame members, said track constructed and arranged to support a sliding door movable between said first and second end of said header support;

a first vertical spreader spaced apart from a second vertical spreader by a first distance, each said first and second spreader fasted to, and extending from said header support at about a midpoint position between said header support first and second end, a base member having a front end and a back end forming a second length therebetween, said front end fastened to said first and second vertical spreader forming an opening sized to allow a sliding door to pass through said opening;

a vertical stud member attached to said first end of said header support and said back end of said base member, said vertical stud member having a width measured between a first edge wall and a second edge wall;

a plurality of inboard horizontally disposed slats fastened to an inner surface of said first vertical spreader and said first edge wall of said vertical stud member, said inboard horizontally disposed slats spaced apart between said base and said header support;

a plurality of outboard horizontally disposed slats fastened to an inner surface of said second vertical spreader and said second edge wall of said vertical stud member; said outboard horizontally disposed slats spaced apart between said base and said header support;

a first plywood panel positioned adjacent said first vertical spreader and extending from said base to said header support and fastened to said inboard horizontally disposed slats;

a first base block extending between said base member and said header support, said first base block secured to said first vertical spreader and each said inboard horizontally disposed slats;

a second plywood panel positioned adjacent said second vertical spreader and extending from said base to said header support and fastened to said outboard horizontally disposed slats;

a second base block extending between said base member and said header support, said second base block secured to said second vertical spreader and each said outboard horizontally disposed slats;

wherein said pocket door frame is constructed and arranged to provide dimensional stability and prevent warping or twisting of the pocket door frame.

2. The pocket door frame according to claim 1 wherein each said first and second vertical spreader is made from laminated ¾ inch primed finger joint pine.

3. The pocket door frame according to claim 1 wherein said first and second vertical spreaders and said vertical stud member are load bearing.

4. The pocket door frame according to claim 1 wherein each said inboard and outboard horizontally disposed slats is made from primed finger joint pine.

5. The pocket door frame according to claim 1 wherein said first plywood panel is about 7¾ inches wide.

6. The pocket door frame according to claim 1 wherein said second plywood panel is about 16 inches wide.

7. The pocket door frame according to claim 1 wherein a pocket recess is about 2¼ inches wide.

8. The pocket door frame according to claim 1 wherein said inboard and outboard horizontally disposed slats are constructed of ½ inch primed finger joint pine stapled and glued using an installation jig to ensure even spacing between slats and obtain square alignment.

9. The pocket door frame according to claim 1 wherein said track is mounted to said header support with T-bolts and reciprocal fasteners.

10. A pocket door frame for a sliding door comprising a header support having a first end and a second end forming a first length therebetween;

first and second header spacers secured to said header support and extending along said first length of said header support;

first and second header frame members secured to said first and second header spacers;

a track fastened to a lower surface of said header support by T-bolt fasteners and nested between said first and second header spacers and said first and second header frame members, said track constructed and arranged to support a sliding door movable between said first and second end of said header support;

a first vertical spreader made of laminated ¾ inch primed finger joint pine is spaced apart by 2¼ inches from a second vertical spreader made of laminated ¾ inch primed finger joint pine by a first distance, each said first and second spreader fasted to, and extending from, said header support at about a midpoint position between said header first and second end;

a base member having a having a front end and a back end forming a second length therebetween, said front end fastened to said first and second vertical spreader forming an opening sized to allow a sliding door to pass through said opening;

a vertical stud member attached to said first end of said header support and said back end of said base member, said stud member having a width measured between s first edge wall and a second edge wall;

a plurality of inboard horizontally disposed slats made of primed finger joint pine are fastened to an inner surface of said first vertical spreader and said first edge wall of said vertical stud member, said inboard horizontally disposed slats spaced apart between said base and said header support;

a plurality of outboard horizontally disposed slats made of primed finger joint pine are fastened to an inner surface of said second vertical spreader and said second edge wall of said stud member; said outboard horizontally disposed slats spaced apart between said base and said header support;

a first plywood panel having a width of 7¾ inches is positioned adjacent said first vertical spreader and extending from said base to said header support and fastened to said inboard horizontally disposed slats;

a first laminated base block extending between said base member and said header support, said first laminar base block secured to said first vertical spreader and each said inboard horizontally disposed slats;

a second plywood panel having a width of 16 inches is positioned adjacent said second vertical spreader and extending from said base to said header support and fastened to said outboard horizontally disposed slats;

a second laminated base block extending between said base member and said header support, said second laminar base block secured to said second vertical spreader and each said outboard horizontally disposed slats;

wherein said pocket door frame is constructed and arranged to provide dimensional stability and prevent warping or twisting of the pocket door frame.

11. The pocket door frame according to claim 10 wherein said first and second vertical spreaders and said vertical stud member are load bearing.

12. The pocket door frame according to claim 10 wherein said inboard and outboard horizontally disposed slats are constructed of ½ inch primed finger joint pine stapled and glued using an installation jig to ensure even spacing between slats and obtain square alignment.

* * * * *